No. 747,478. PATENTED DEC. 22, 1903.
A. S. REED.
SPROCKET BAND.
APPLICATION FILED AUG. 30, 1902.
NO MODEL.

Witnesses:

Inventor:
Albert S. Reed,
By Barton & Tanner,
Attorneys.

No. 747,478. Patented December 22, 1903.

UNITED STATES PATENT OFFICE.

ALBERT S. REED, OF CHICAGO, ILLINOIS, ASSIGNOR OF ONE-HALF TO FLORENCE HARRIS, OF CHICAGO, ILLINOIS.

SPROCKET-BAND.

SPECIFICATION forming part of Letters Patent No. 747,478, dated December 22, 1903.

Application filed August 30, 1902. Serial No. 121,572. (No model.)

*To all whom it may concern:*

Be it known that I, ALBERT S. REED, a citizen of the United States, residing at Chicago, in the county of Cook and State of Illinois, have invented a certain new and useful Improvement in Sprocket-Bands, (Case No. 5,) of which the following is a full, clear, concise, and exact description.

My invention relates to sprocket-and-chain gearing; and its object is to provide a device by which the wear of the sprocket and the stretch of the chain may be compensated for, so that the gearing may run easily and properly.

When a sprocket and chain, which were originally designed to fit one another, have been in use for some time, it is found that the chain is stretched, so that the pitch of each link is increased, while the sprocket is worn away in such a manner as to decrease the pitch of its teeth. The chain, therefore, no longer fits the sprocket accurately, so that the wear and friction are increased and more power is required to drive the gearing. Furthermore, the strain instead of being equally distributed around the sprocket is brought practically on one tooth, so that the liability of the sprocket-teeth to break off is increased.

I have devised an exceedingly simple and effective means for readjusting the sprocket and chain to one another, so that they will fit accurately and run smoothly. I provide a metal strip perforated to correspond to the pitch of the sprocket, which is adapted to be passed around the sprocket as a band and fastened in place. This metal strip may be made in long lengths and pieces cut off as required to fit any size sprocket.

I will describe the invention more particularly by reference to the accompanying drawings, in which—

Figure 1:
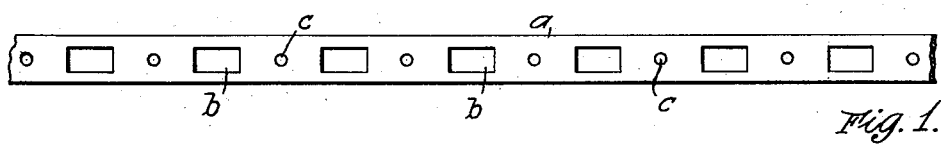
Figure 2:
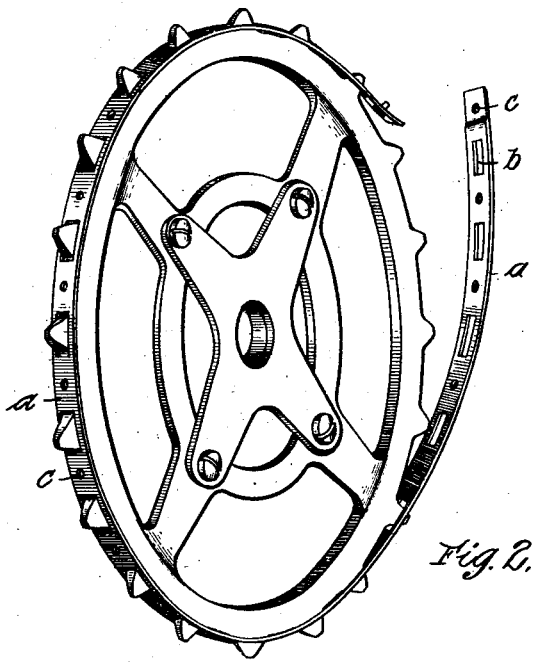
Figure 3:
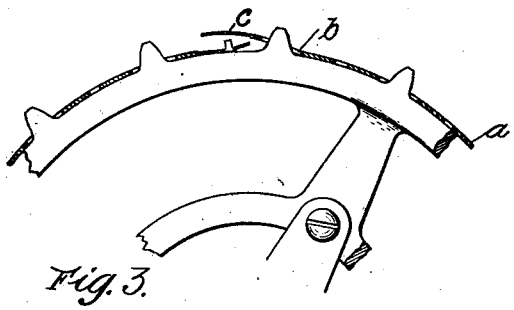
Figure 4:
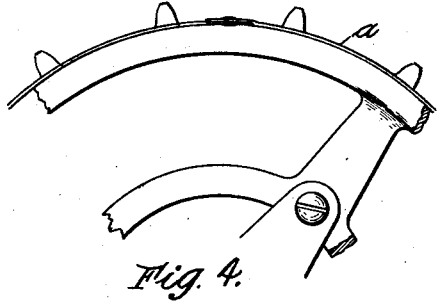

Figure 1 is a plan view of a length of my improved sprocket-band. Fig. 2 is a perspective view of a sprocket, showing how the band is applied; and Figs. 3 and 4 are details showing how the ends of the band are brought together and fastened upon the sprocket.

The same letters of reference are used to designate the same parts wherever they are shown.

The metal strip $a$ is provided with rectangular perforations $b\ b$ at intervals corresponding to the pitch of the sprocket to be fitted, said perforations being adapted to receive the teeth of the sprocket. The band is also provided with rivet-holes $c\ c$ between the perforations $b$. This metal strip may be made and sold in considerable lengths, and the repairman will cut off lengths corresponding to the sprocket to be fitted. The band will then be applied to the sprocket, as shown in Fig. 2, and the ends thereof brought together and fastened by a rivet, as shown in Figs. 3 and 4.

When the band is in place, it will be seen that the effective diameter of the sprocket-wheel will thus be increased. The sprocket-chain will therefore engage the teeth nearer their ends—that is to say, along a line farther from the center of the wheel—so that the effective pitch of the teeth—that is, the distance from the engaging surface of one tooth to a corresponding surface of the next tooth—will be increased to compensate for the stretching of the chain and the wearing away of the sprocket.

Having thus described my invention, I claim—

A compensating device for sprocket-wheels comprising a continuous flat strip of sheet metal, said strip having rectangular perforations at intervals corresponding to and adapted to fit over the teeth of a gear-wheel, and intermediate rivet-holes $c\ c$, one between each two of said perforations, whereby a sprocket having any number of teeth may be fitted with said compensating device cut off to the proper length to encircle the sprocket, said strip having its ends fastened together by rivets passing through the registering rivet-holes in said ends.

In witness whereof I hereunto subscribe my name this 27th day of August, A. D. 1902.

ALBERT S. REED.

Witnesses:
ELIJAH T. HARRIS,
G. D. OSTRUM.